April 20, 1965  C. H. RICKMEIER, JR  3,179,287
STEAM TABLE FOOD TRANSFER PAN ASSEMBLAGES
Filed Aug. 1, 1963  2 Sheets-Sheet 1
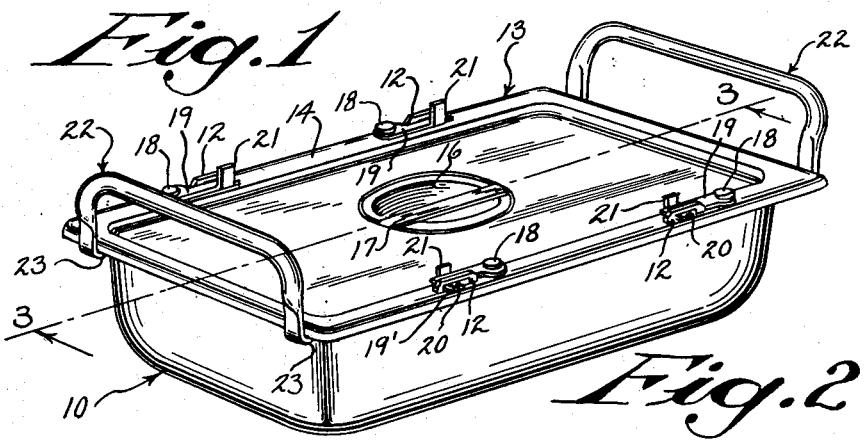
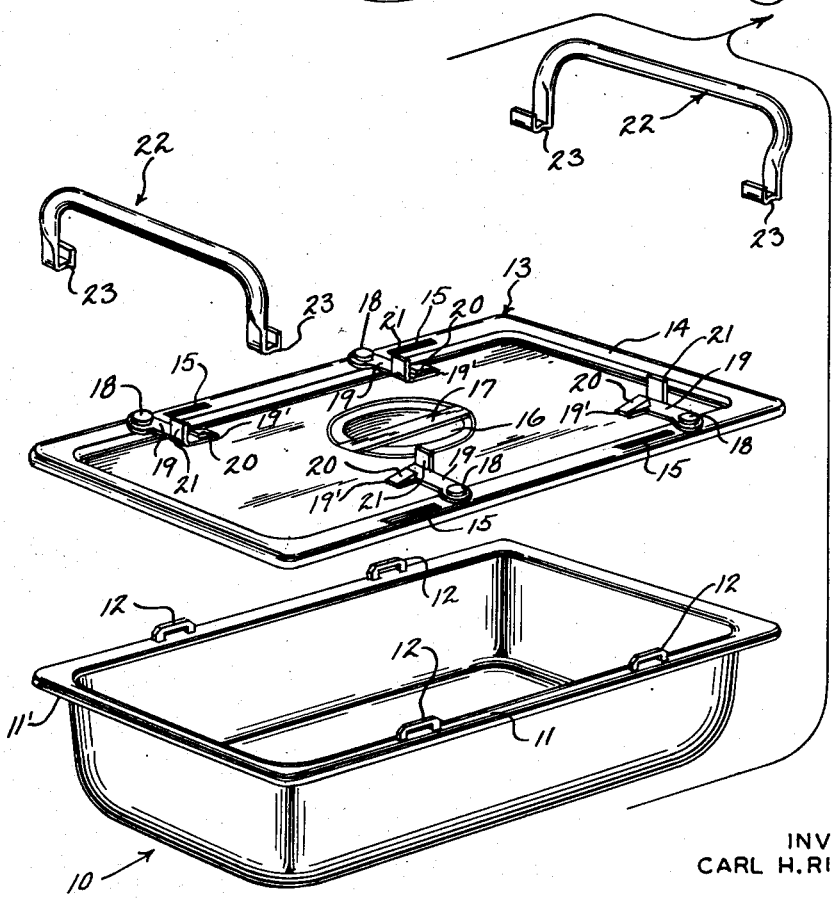
INVENTOR
CARL H. RICKMEIER, JR.
BY
Morsell + Morsell
ATTORNEYS April 20, 1965  C. H. RICKMEIER, JR  3,179,287
STEAM TABLE FOOD TRANSFER PAN ASSEMBLAGES
Filed Aug. 1, 1963  2 Sheets-Sheet 2
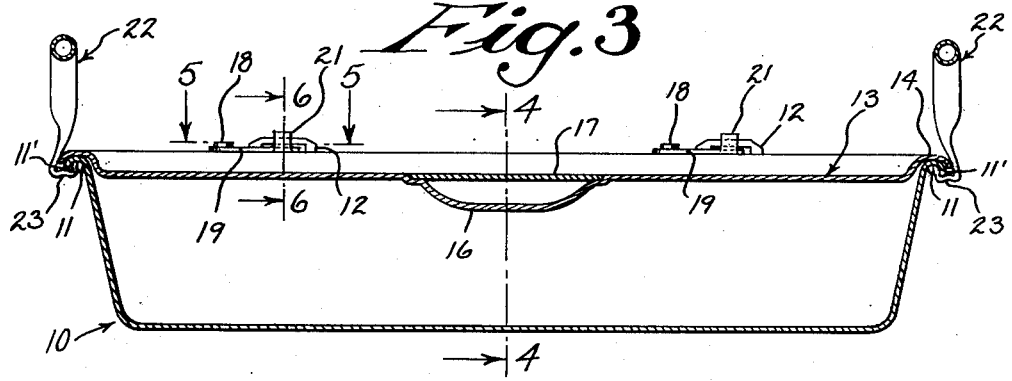
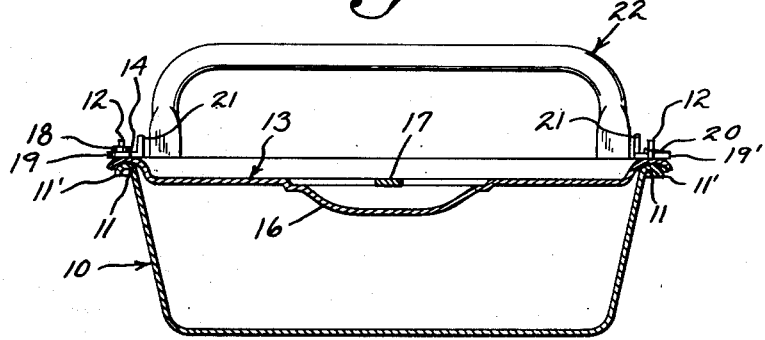
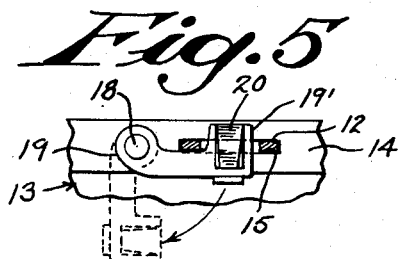
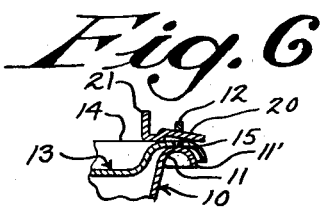
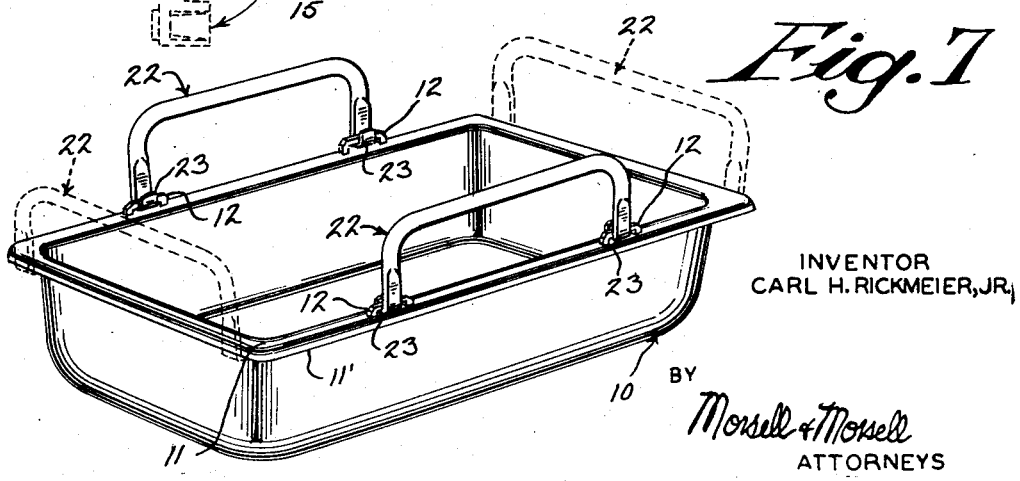
INVENTOR
CARL H. RICKMEIER, JR.
BY
Morsell & Morsell
ATTORNEYS

United States Patent Office 3,179,287
Patented Apr. 20, 1965

3,179,287
STEAM TABLE FOOD TRANSFER PAN ASSEMBLAGES
Carl H. Rickmeier, Jr., Sheboygan, Wis., assignor to The Vollrath Co., Sheboygan, Wis., a corporation of Wisconsin
Filed Aug. 1, 1963, Ser. No. 299,300
1 Claim. (Cl. 220—94)

This invention relates to improvements in steam table food transfer pan assemblages, and more particularly to a prepared food containing pan, cover and handle assemblage adapted for use by hotels, restaurants or caterers, which will permit the serving and transporting of prepared foods which have been maintained in a heated condition in a steam table.

A steam table food transfer pan, while normally maintaining prepared foods in a heated condition on or in a steam table, is customarily adapted for removal from the steam table, and the restaurant or caterer may serve foods directly from the pan and, additionally, the steam table food transfer pan may be transported a substantial distance from the kitchen where the foods are prepared to a remote location for serving. Under such conditions it is desirable that the pan be tightly fitted with a cover which will maintain food therein in a hot condition and, furthermore, handling and transportation of the pan is facilitated by the provision of handles for manually engaging and moving the hot food containing pan.

With the foregoing in mind, it is, therefore, a primary object of the present invention to provide a steam table food transfer pan assemblage which includes a pan or receptacle, a cover which may be releasably applied to the open side of the pan in a very tight condition, and detachable handles which may be engaged with selected margins or lips of the pan to facilitate manual handling of the same without the use of hot pads or the like.

A further object of the invention is to provide a steam table pan assemblage which may be used either with or without an associated cover and, when the cover is removed, the pan serves as a steam table pan or receptacle and, when the cover is applied and tightly locked into place, the assemblage can be used as a transportable receptacle or container for foods.

A further object of the invention is to provide a steam table food transfer pan assemblage which includes a pair of separate handle members which may be applied to the assemblage in a variety of ways, depending upon the location of the pan, and the convenience of the attendant.

A further object of the invention is to provide a steam table food transfer pan assemblage in which the cover is tightly secured onto the open face of the pan by means of wedge locking means, which, when in their locking position, provide upright lugs to locate pans or utensils stacked onto the pan cover.

A further object of the invention is to provide a steam table food transfer pan assemblage which includes detachable handles which may be applied to desired marginal or rim portions of the pan itself, or which may be readily applied to the pan with a cover locked thereon.

A further object of the invention is to provide a steam table food transfer pan assemblage which is of very simple construction, which is convenient and efficient in use, which is versatile, and which is well adapted for the purposes described.

With the above and other objects in view, the invention consists of the improved steam table food transfer pan assemblage and its parts and combinations as set forth in the claim, and all equivalents thereof.

In the accompanying drawings, in which the same reference characters indicate the same parts in all of the views:

FIG. 1 is a side and end perspective view of the improved steam table food transfer pan, with the cover applied thereto, and showing one manner in which the carrying handles may be engaged with the rim of the pan;

FIG. 2 is an exploded view of the components of the assemblage shown in FIG. 1 with the cover locking means in their released positions;

FIG. 3 is a longitudinal vertical sectional view taken along the line 3—3 of FIG. 1 and on a slightly larger scale;

FIG. 4 is a transverse sectional view taken along the line 4—4 of FIG. 3;

FIG. 5 is a fragmentary plan view partly in section, taken along the line 5—5 of FIG. 3, a cover locking member being shown in its engaged position in full lines, and there being a dotted line showing of the locking member in its release position;

FIG. 6 is a fragmentary detail sectional view taken on the line 6—6 of FIG. 3; and FIG. 7 is a side and end perspective view of the pan with the cover removed and showing in full lines one way in which the carrying handles may be engaged with the pan and showing in dotted lines an optional way of applying the handles.

Referring now more particularly to the drawings, it will appear that the improved steam table food transfer pan assemblage includes a rectangular pan or receptacle 10 whose open upper end is surrounded by an outwardly projecting horizontal annular ledge or flange 11 which is relatively flat on its upper surface but which has a downwardly rolled or hooked outer margin 11'. Each longitudinal extent of the flange or ledge 11 has affixed thereto, in spaced relation, and projecting upwardly from the top surface of the flange 11, a pair of open straps 12 of inverted U formation.

A rectangular cover member or lid is designated generally by the numeral 13 and the same is of a size and shape to overlie the open top of the pan or receptacle 10. The margin of the cover 13 is formed by a slightly rolled flange 14 which extends above the plane of the major portion of the cover and is adapted to engage over the annular flange or ledge 11 of the pan 10, when the cover is applied to the pan. The longitudinal extents of the cover marginal flange 14 have spaced-apart slots 15 therein, the spacing of which corresponds to the spacing of the straps 13 on the ledge of the pan 10. Consequently, when the cover is applied to the open top of the pan 10, as in FIGS. 1, 3 and 4, the slots 15 in the cover will register with the straps 12 and the straps 12 will project upwardly through said cover slots 15, as best shown in FIGS. 3, 4 and 6. The central portion of the inwardly offset main extent of the cover 13 is formed with a circular dished portion 16 spanned by a diametrically extending strip 17. The dished portion 16 accommodates a person's hand with the fingers engaging the strip 17 which serves as a handle whereby the cover 13 may be manually engaged and lifted to and from the pan 10.

Each longitudinal extent of the cover flange 14, in spaced relation to the slots 15 therein, has pivotally mounted thereon, by a pivot stud 18, an end portion of a cover locking arm 19 which is shaped as best shown in FIGS. 2 and 5 and includes a locking end 19' directed at right angles to the axis of the main portion of its cover locking arm 19. Each arm portion 19' carries on its upper face an inclined wedge block 20, and each arm 19, where it is joined by the locking end 19', carries an upstanding lug 21. Each locking arm 19, when the cover 13 is applied to the upper end of the pan 10, with the pan straps 12 projected through the cover slots 15, is adapted to be swung from the cover locking position shown in full lines in FIG. 5 to the dotted line position thereshown, wherein the locking arm is disengaged, the last-mentioned position of the arms being also shown in FIG. 2.

Each of a pair of carrying handles is designated by the numeral 22, and each handle is of inverted U-form, and the ends of the arms or legs thereof are of hooked formation, as designated by the numeral 23.

The basic pan member 10 of the assemblage may be normally used in its uncovered condition in a hotel or restaurant steam table, and as so used it is, of course, filled with food which has been cooked or prepared, and the food is maintained in a warm condition in the pan 10. When it is desired to handle or move the pan 10, the pair of handles 22 may be applied to the pan in a variety of ways, depending upon the convenience of the manipulator and the location of the pan. For instance, the handles may be hooked under the rolled or hooked portions 11' of the flange at the opposite ends thereof, as shown in FIGS. 1 and 3, or the hooked ends of the handles may be engaged under the rolled marginal portions 11' of the longitudinal or side extents of the ledge or flange 11 of the pan. A third way of engaging the handles 22 with the pan is to hook the ends 23 of the handles through the openings in the straps 12 on the longitudinal edges of the flange 11, as shown in full lines in FIG. 7. With the handles attached as described, it is apparent that the hot pan can be lifted from the steam table or readily maneuvered without the use of independent appliances or hot pads.

In order to transport heated food from the steam table of the kitchen or from an oven or other cooking appliance to a more remote point, it is essential that the open end of the pan 10 be tightly covered. When this is the case, the cover 13 should be flatly applied to the open end of the pan 10, with the annular flange 14 of the cover coinciding with and overlying the annular ledge or flange 11 of the pan. As so positioned, the location of the cover flange slots 15 is such that the pan carried straps 12 will project through the cover slots. To tightly lock the cover onto the flange of the pan, the locking arms 19 are then swung from their inoperative positions of FIG. 2 to their effective locking positions of FIGS. 1, 3 and 4. As the arms 19 are swung into locking position within the cooperating, open straps 12, the wedge blocks 20 on the ends 19' of the locking arms come into play and cause the cover to be tightly clamped onto the flange of the pan. In the locking positions of the arms 19, the upright lugs 21 form spaced protuberances on the flange 14 of the cover and permit other utensils or vessels to be stacked onto the covered pan assemblage and prevent the stacked utensils from sliding off of the pan.

When the pan is covered for the transportation of food to a remote location, as by a caterer, manual handling of the covered assemblage is facilitated by applying the handles 22 to the covered pan. Again, the hooked ends of the handles may be applied under the rolled margin of the pan flange 11, either at opposite ends thereof or at opposite sides. The pan assemblage, with the cover tightly clamped in place, besides protecting the food in the pan, prevents spillage of the contents of the pan during distant transportation.

The improved steam table food transfer pan assemblage is versatile in that it provides a pan to be in-set into a steam heated table and, with the cover applied, it constitutes a transfer or transport food pan. In either condition, the detachable handles are readily attachable for convenience in handling the assemblage. The steam table food transfer pan assemblage is convenient and efficient to use, is sanitary and is well adapted for the purposes described.

What is claimed as the invention is:

A food transfer pan assemblage comprising: a rectangular normally open pan having walls which carry an outwardly projecting annular horizontal flange on their upper margin, said flange having opposed side extents, with the outer peripheral portion of said flange being downwardly rolled, a pair of upstanding straps spacedly anchored on upper surface portions of said side extents of the side walls of said pan flange, each strap having a slot therein, a rectangular cover having an inwardly offset imperforate main extent, the inwardly offset main extent having a circular dished portion spanned by a diametrically extending strip, the margin of the cover having an annular horizontal flange to seat on the upper surface of the annular flange of said pan when the cover is applied thereto, said cover flange having opposed side extents formed with spaced-apart slots registering with said pan flange straps and through which the latter project with the slots in the straps being exposed above the upper surface of the cover, locking arms pivotally mounted on the cover flange side extents adjacent the slots therein for movement in a horizontal plane, the outer end portion of each locking arm is directed at right angles to the axis of the main portion of the locking arm and is formed with an upstanding wedge inclined from the horizonal, portions of said locking arms inwardly of their wedges carrying upstanding lugs which are adapted to engage and locate a stacked pan, pivotal movement of said arms in one direction projecting the wedges into the strap slots in binding engagement with stock of the straps adjacent said slots to force the cover flange into sealing engagement with the pan flange, and independent handles having hook-shaped inner end portions for selective detachable engagement with the downwardly rolled peripheral portions of the pan flange or with said slotted straps.

References Cited by the Examiner

UNITED STATES PATENTS

| 1,206,090 | 11/16 | Carper et al. | 220—95 |
| 1,869,234 | 7/32 | App | 220—94 |
| 1,957,379 | 5/34 | App | 220—94 |
| 1,985,571 | 12/34 | Hetzel | 294—27 |
| 2,137,531 | 11/38 | Jones | 292—303 |
| 2,983,400 | 5/62 | Bombarger | 220—7 |
| 3,112,948 | 12/63 | Burns | 294—27 |

FOREIGN PATENTS 141,838 11/30 Switzerland.

THERON E. CONDON, *Primary Examiner.*